United States Patent [19]

Bonnice

[11] 4,186,628
[45] Feb. 5, 1980

[54] ROTARY DRILL BIT AND METHOD FOR MAKING SAME

[75] Inventor: Phillip E. Bonnice, Worthington, Ohio

[73] Assignee: General Electric Company, Worthington, Ohio

[21] Appl. No.: 888,259

[22] Filed: Mar. 20, 1978

Related U.S. Application Data

[62] Division of Ser. No. 746,044, Nov. 30, 1976, Pat. No. 4,098,362.

[51] Int. Cl.² .............................................. B21K 5/02
[52] U.S. Cl. ................................................. 76/108 A
[58] Field of Search ............ 76/108 A, 108 R, 101 R, 76/101 A, DIG. 11

[56] References Cited

U.S. PATENT DOCUMENTS

| | | | |
|---|---|---|---|
| 3,175,427 | 3/1965 | Bridwell | 76/108 R |
| 3,407,445 | 10/1968 | Strong | 76/101 A |
| 3,726,351 | 4/1973 | Williams, Jr. | 76/108 A |
| 4,006,788 | 2/1977 | Garner | 175/330 |

OTHER PUBLICATIONS

GE Application Engineering Booklet, pp. 1-16, distributed by GE, May 1975.

Primary Examiner—Othell M. Simpson
Assistant Examiner—Roscoe V. Parker, Jr.
Attorney, Agent, or Firm—Morgan, Finnegan, Pine, Foley & Lee

[57] ABSTRACT

A rotary rock drill bit comprising a plurality of cutting elements or cutters mounted in the crown of the drill bit. Each cutting element comprises a thin planar layer of polycrystalline diamond bonded in the crown of the bit at a rake angle of between −10° and −25°. In another embodiment each cutting element comprises an elongated pin mounted at one end in the drill crown and thin layer of polycrystalline diamond bonded to the free end of the pin so as to be disposed at a rake angle of between −10° and −25°.

6 Claims, 9 Drawing Figures

ROTARY DRILL BIT AND METHOD FOR MAKING SAME

This is a division of application Ser. No. 746,044, filed Nov. 30, 1976 now U.S. Pat. No. 4,098,362.

CROSSREFERENCE TO RELATED APPLICATION

U.S. patent application Ser. No. 699,411 filed 6/24/76, now U.S. Pat. No. 4,109,737 and assigned to the assignee of the invention herein is directed to a rotary drill bit comprising a plurality of cutting elements comprised of an elongated pin with a thin layer of diamond bonded to the exposed end of the pin.

BACKGROUND OF THE INVENTION

This invention relates to rotary drill bits and more particularly to rock drill bits with a polycrystalline abrasive as the cutting or abrading material.

Conventional rotary drill bits for oil and gas well drilling core drilling have heretofore used cutting elements such as (1) steel teeth, (2) steel teeth laminated with tungsten carbide, (3) a compact insert of sintered tungsten carbide, and (4) natural diamonds all of which are set or molded in a tungsten carbide crown or cone. Due to the relatively short life and/or high operating cost of these conventional designs, it has recently been proposed to use synthetic diamond compacts as the cutting element in such drills.

To date, attempts to use diamond compacts in these applications have, for the most part, been unsuccessful. In one such attempt diamond compacts are comprised of right circular cylinders with a thin layer of polycrystalline diamond bonded to a cemented carbide substrate. A cutting element is formed by attaching the compact to the drill bit by brazing or soldering the carbide substrate to a cemented carbide pin which is inserted into holes in the drill crown. The diamond layer is generally oriented in a radial sense to the center of rotation of the drill bit and penetrates the rock essentially as a cutting tool in a similar manner to a cutting tool which is used to cut metal on a lathe.

Several problems have been encountered with this design and a commercially feasible drill bit has yet to be tested based on this structure.

One problem is that, although in this design the cutting elements protrude from the bit body and thereby provide aggressive cutting action and abundant room for swarf removal, the stresses on each cutting element are severe and frequent failures occur by pin shearing or compact cracking. The stresses are caused because the structure of most rocks is heterogeneous and thus has layers of varying hardness. These layers cause a large variation in the impact loads to be applied to the cutting elements during drilling. The prior art designs are not strong enough, nor are the compacts shock resistant enough, to withstand such widely varying impact loading.

Another problem occurs during manufacturing of the cutting element. The process of brazing the composite compacts to the pin structure requires temperatures approaching those where the diamond layer is degraded. Hence, many of the compacts are "softened" if great care is not taken in the brazing operation.

Still another problem is that the degradation temperature (700° C.) of the compacts is far below the 1200° C. to 1400° C. temperature which would be required to sinter the compacts in an abrasion resistant drill crown matrix (e.g., of tunsten carbide) in an analogous manner to that used to fabricate drill crowns of natural diamond set in the surface of an abrasion resistant matrix.

OBJECTS OF THE INVENTION

Accordingly, it is an object of this invention to provide an improved drill bit which eliminates or mitigates the problems noted hereinabove.

Another object of this invention is to provide a rock drill bit which can be operated at faster penetration rates.

Another object of this invention is to provide a rock drill bit with a cutting element which is stronger and more impact resistant.

SUMMARY OF THE INVENTION

These and other objects of the invention, which will be appreciated from a consideration of the following detailed description and accompanying claims, are accomplished by providing a drill bit comprising a plurality of cutting elements which are mounted in the crown of the drill bit. Each cutting element comprises a planar layer of bonded polycrystalline diamond particles mounted in the crown at a rake angle between $-10°$ and $-25°$. In another embodiment each cutting element comprises an elongated pin mounted at one end in the drill crown and thin layer of polycrystalline diamond bonded to the free end of the pin so as to be disposed at a rake angle of between $-10°$ and $-25°$.

DESCRIPTION OF THE PREFERRED EMBODIMENTS

Figure 1A:
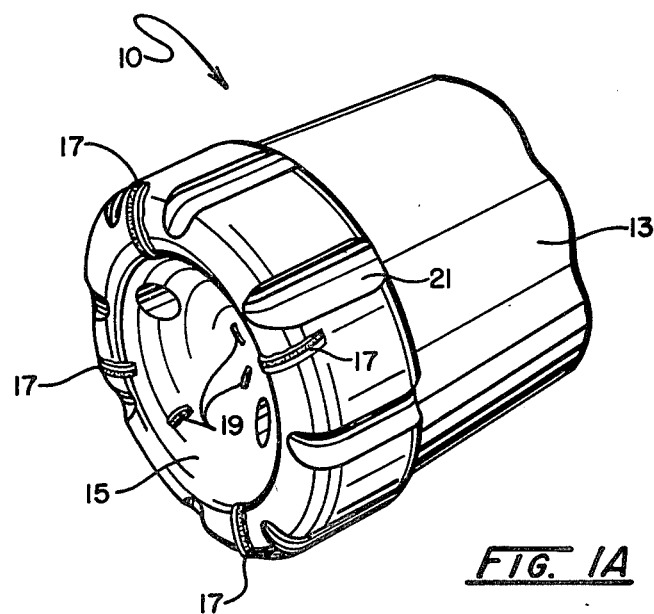
FIGS. 1A and 1B are fragmentary perspective and plan views, respectively, of a non-coring drill bit in accordance with one embodiment of this invention.
Figure 1B:
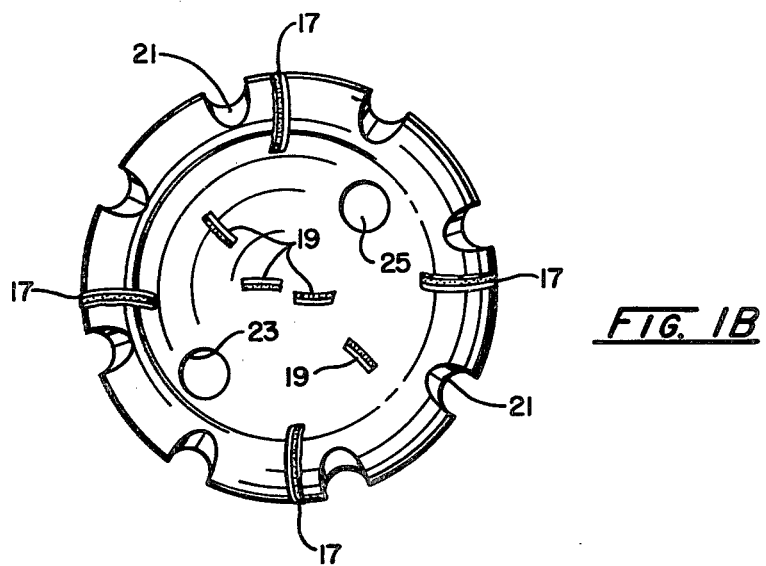
Figure 1C:
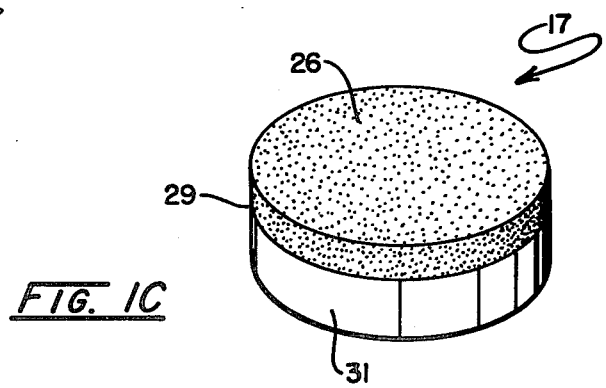
FIG. 1C is a perspective view of a diamond compact cutting element for the drill bit of FIGS. 1A and 1B.

In accordance with one embodiment of this invention, FIGS. 1A and 1B show a rotary non-coring drill bit 10 comprising an elongated, threaded shaft 13 and a drill crown 15 in which a plurality of peripheral diamond compact cutting elements 17 and of central diamond compact cutting elements 19 are mounted. A plurality of waterways 21 are formed in the drill crown 13 for providing access of a cooling fluid to the interface between the drill crown and the earth during use of the drill. Fluid ports 23 and 25 are provided longitudinally of the drill for transmission of a fluid to aid in mud and rock cutting removal. FIG. 1C illustrates one of the diamond compact cutting elements 17 such as shown in FIGS. 1A and 1B. Compact 17 is comprised of a thin planar layer 29 of polycrystalline diamond bonded to a cemented carbide substrate 31. Compact cutting elements 19 are identical to compact cutting elements 17, except that elements 19 comprise a 180° disc-shaped segment, rather than a 360° segment. The central cutting elements may also be in the shaped of rectangular parallelopiped. Also, other shape variations of elements 17, 19 may be used. Compact cutting elements 17 and 19 are preferrably constructed in accordance with the teaching of Wentorf, Jr., U.S. Pat. No. 3,745,623, the disclosure of which is hereby incorporated herein by reference.

Figure 2:
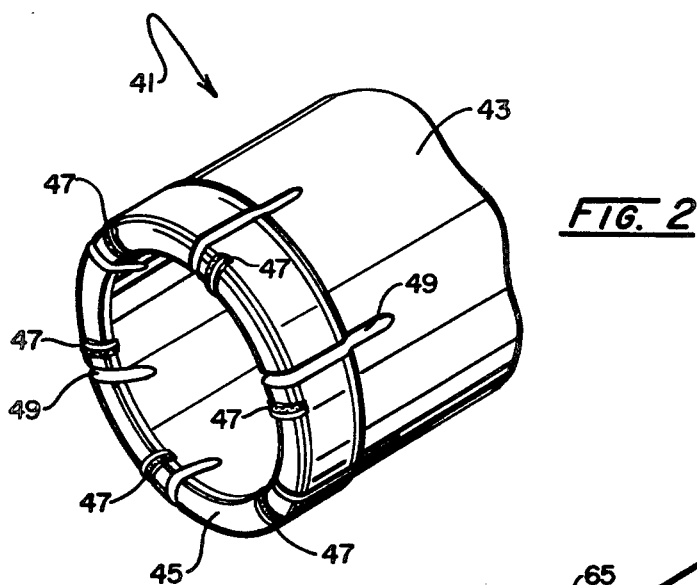
FIG. 2 is a fragmentary perspective view of a coring drill bit in accordance with a second embodiment of this invention.

A second embodiment of this invention is shown in FIG. 2. In this embodiment, a core dill 41 comprises an elongated shaft 43 and a drill crown 45 in which a plu111ity of cutting elements 47 are mounted. A plurality of waterways 49 are provided in the drill crown to allow access of a cooling fluid to the interface between the drill crown and the earth's surface. Cutting elements 47 are disc-shaped diamond compacts such as shown and described in connection with FIG. 1C above.

Figure 3:
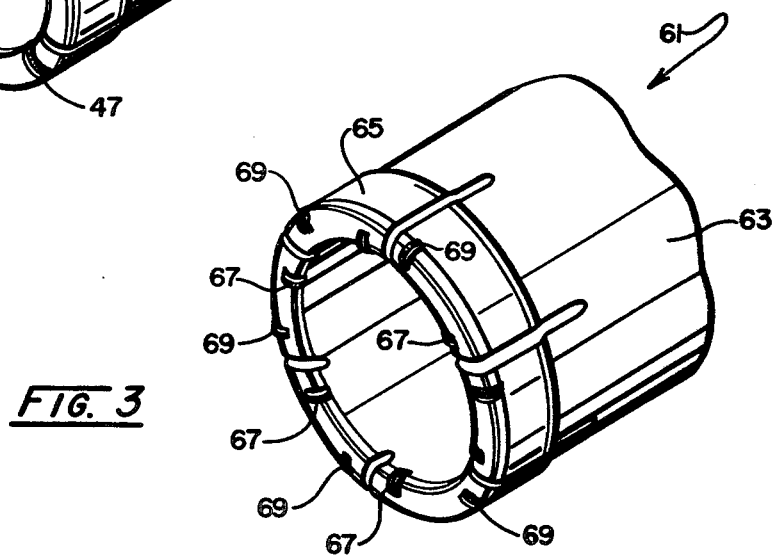
FIG. 3 is a perspective view of a drill bit in accordance with a third embodiment of this invention.

A third embodiment of this invention is shown in FIG. 3. In this embodiment a two-tier crown bit 61 comprises an elongated shaft 63 and a drill crown 65 is which an inner tier 67 and outer tier 69 of cutting elements are mounted. Cutting elements 67, 69 are preferably of the type shown and described in connection with FIG. 1C above.

Figure 4A:
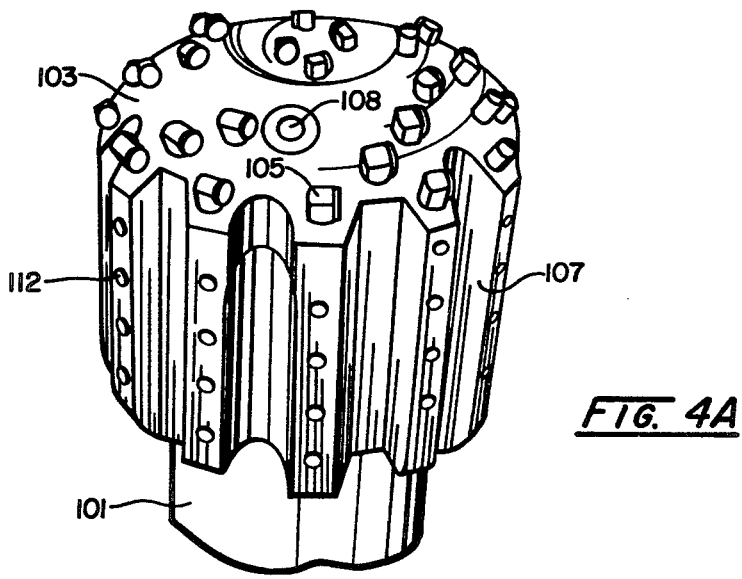
FIG. 4A is a view of a non-coring bit in accordance with a fourth embodiment of this invention.

FIG. 4A shows a fourth embodiment of this invention. In this embodiment, a drill bit 100 is comprised of an elongated shaft 101 and a drill crown 103 (e.g., of steel) in which a plurality of cutting elements 105 are mounted in recesses (not shown) preferably by press-fitting. A plurality of fluid courses 107 are formed in the drill crown 103 for providing access for a cooling fluid to the interface between the drill crown and the earth during drilling applications. One or more fluid ports or nozzles 108 are provided longitudinally of the drill for transmission of fluid to aid in mud and rock cutting removal. A plurality of tungsten carbide wear-surface buttons 111 are provided on the cylindrical portion of the crown 103.

Figure 4B:
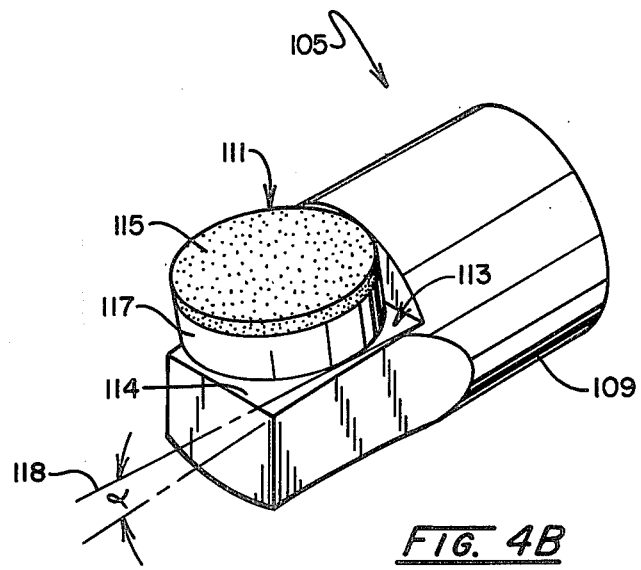
FIG. 4B is a perspective view of a cutting element for the drill bit of FIG. 4A.

FIG. 4B shows a perspective view of one of the cutting elements 105 shown in FIG. 4A. The cutting element 105 comprises an elongated pin 109 preferably of metal bonded carbide (also known as "sintered" or "cemented" carbide) with a diamond compact 111 of the type shown in FIG. 1C mounted at one end in an inclined recess 113 formed in pin 109. The compact 111 is comprised of a thin layer of polycrystalline diamond 115 bonded to a sintered carbide substrate 117. The compact 111 is bonded in the recess 113 usually by brazing or soldering. A low temperature melting brazing alloy such as a commercially available silver solder (by weight: 45% Ag, 15% Cu, 16% Zn, and 24% Cd.) may be used if care is exercised not to heat the compacts 111 above its thermal degradation point of about 700° C. The bottom surface 114 of recess 113 is inclined at angle α between −10° and −25° with respect to a line 118 parallel to the axis of the pin 109. The purpose of this disposition will be described in detail in connection with FIGS. 5 and 6 hereinbelow.

In connection with the features of this invention as exemplified in each of the four embodiments, it has been discovered that significant advantages result from the orientation of the cutting elements at a rake angle between −10° and −25°.

Figure 5:
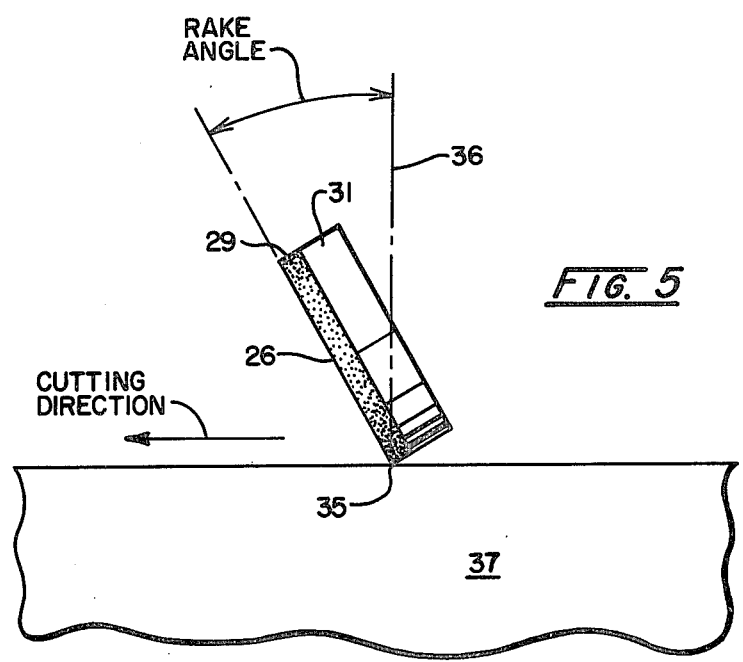
FIG. 5 is a schematic illustration of the disposition of a cutting element such as shown in FIG. 1C and FIG. 4B.
Figure 6:
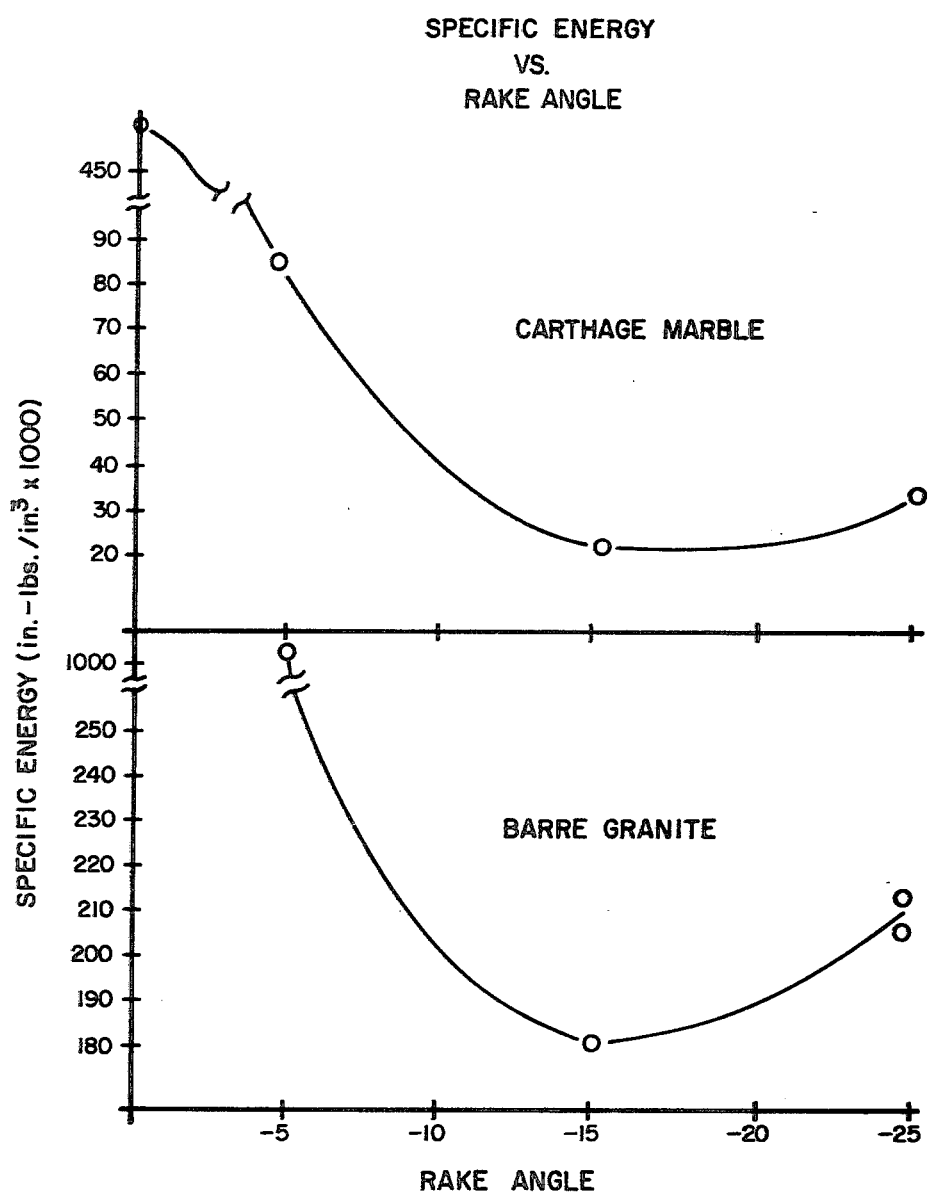
FIG. 6 is a graph of the specific energy as a function of rake angle for a laboratory drilling test illustrating a feature of this invention.

As shown in FIG. 5, the rake angle is defined as the angle of orientation of face 26 of diamond layer 29 with respect to a line 36 drawn perpendicular to a work surface 37. Plane 26 is oriented to face the direction of movement of the cutting element (i.e., to the left in FIG. 5 or in actuality clockwise (when viewed toward rock surface 37) for a drill rotated about perpendicular 36). As is conventional, angles are positive and negative when measured in the clockwise and counterclockwise directions, respectively.

With the proper rake angle the impact resistance of the cutting elements is substantially improved and the specific energy required for a drill with such a bit is substantially reduced.

The improved impact resistance of the disc-shaped diamond compact cutting elements is illustrated in a laboratory test in which a plurality of cutting elements were exposed at a variety rake angles and impacted on the edge of a diamond layer with a cemented carbide pin with a conical point. Each cutting element was subjected to repeated impacts with the point of the pin until fracturing or delamination of the diamond layer occurred.

The dimensions (in millimeters) of the cutting elements used in the test were:

|  | TYPE A | TYPE B |
| --- | --- | --- |
| Thickness of diamond layer: | 0.5 | 0.5 |
| Thickness of carbide layer: | 2.7 | 2.7 |
| Diameter of compact: | 8.4 | 8.4 |
| Size (U.S. Std. Mesh) of diamond particles: | −400 | 80/100 and 120/140 |

The results of the test are given in TABLE 1 below:

TABLE 1

| Rake angle | Type A (Number of Impacts) | Type B (Number of Impacts) |
| --- | --- | --- |
| 0 | 1 | — |
| −15 | 2 | — |
| −25 | 30 | — |
| −5 | 3 | 1 |
| −15 | 8 | 4 |
| −20 | 15 | 10 |
| −25 | 8 | 3 |

It is believed that the superiority in impact resistance of the Type A cutting element is explained by the fact that the diamond layer is comprised of small diamond particles of −400 U.S. Std. Mesh size and is thus stronger, whereas the Type B cutting element comprises a diamond layer of a mixture of 80/100 and 120/140 U.S. Std. mesh size diamond particles. The finer texture of the Type A cutting element is thought to provide a more uniform propagation of the impact shock wave. However, the degree of fracture of the Type A cutting element was significantly greater than that of Type B. For this reason Type B is preferred.

The relationship of the specific energy expenditure of a drill to the rake angle is illustrated by laboratory tests conducted on a rock drill simulator.

Specific energy, $E_S$ is defined as the energy required to remove a cubic inch of stone and is obtained from the equation: $E_S = 34 O F_h D \div A \mu$, where $F_h$ is the horizontal force in lb.; A is the area (square inches) of the path cut into the stone's surface; $\mu$ is penetration rate (inches/minutes) of the cutting element into the stone; and D is the diameter of the path in inches.

The rock drill simulator is a device designed to give the specific energy required for rock cutting as a function of the rake angle of a unitary cutting element. In such a device, a stone is rotated while a unitary cutter element is forced by air pressure vertically downward into a rotating stone face. Force measurements are obtained from a dynamometer in which the cutter element is mounted. Vertical force levels of up to 120 pounds are obtainable.

Operating conditions for tests were:

| Cutter element shape: | rectangular parallelopiped width 2mm. length: 8 mm. |
|---|---|
| Diamond layer: | 0.5 mm. |
| Carbide layer: | 2.7 mm. |
| Diamond size: | −400 U.S. Std. Mesh |
| Verticle force: | 50 pounds |
| Horizontal force: | 30 pounds |
| Rotational speed | 108 rpm |
| All cuts were made dry. | |

Tests were conducted on Carthage marble and Barre granite. Carthage marble is soft rock type whereas Barre granite is a hard rock type. Thus, this test is representative of the performance over wide range of rock types. The test results are grapically illustrated in FIG. 6. It is seen that the minima for both rock samples occurs for a rake angle of between about $-10°$ to $25°$.

EXAMPLES

To better illustrate this invention the following general procedure was used to construct a plurality of drill bits in accordance with this invention.

A cup-shaped graphite mold is made in a shape corresponding to the desired bit configuration. A plurality of recesses are provided in the closed end of the mold to locate, respectively, a plurality of cutting elements in accordance with the desired arrangement in the bit to be molded. Each element is coated with a layer of flux (such as Handy Flux Type D, Handy and Harman Co., New York, N.Y.), allowed to dry, located in a recess, and secured in the recess with a conventional cement or glue. A matrix powder is then poured over the elements in the mold. The powder consists of approximately 75% tungsten powder and 25% carbonyl iron powder, which have been mixed together to provide a homogeneous composition.

After the powder has been added to the mold, a steel drill shaft is then coaxially located above the mold and longitudinally pushed downward into the mold cavity. Mechanical force of about 100 to 150 lbs. is applied to the drill body to ensure that it is securely positioned in the mold.

A low temperature flowing (e.g., 620° C.) alloy material (infiltrant) is prepared by cutting the alloy material into rods of approximately 1 in. in length. The rods are coated with flux in liquid form and allowed to dry. The brazed material is then positioned around the outside of the drill body at the top of the mold. The mold is provided with an inwardly sloped large diameter portion at the top of the mold to permit easy drainage of the brazed material (when in a molten state) downwardly into the mold cavity. The inner diameter of the central body of the mold is also slightly larger than the outer diameter of the drill body to allow the passage of the braze alloy (in a molten state).

A silver solder comprised of by weight: 45% silver; 15% Cu, 16% Zn and 24% Cd is preferably used as the braze material. However, other standard low temperature melting braze materials may be used, if desired. The amount of braze material required to infiltrate the powder mixture is governed by the size of the bit to be fabricated.

After positioning the rods of braze alloy, the mold and its contents are then put into an induction heating unit or furnace and brought to about 700° C. When 620° C. is reached, it is observed that the braze alloy begins to melt and flow downwardly into the mold cavity. The molten alloy infiltrates and fills the voids in the powder mixture. The temperature of the mold and its contents is then brought down to room temperature and the drill body assembly is removed from the mold. The drill crown is a solid mass of powder held together by the braze alloy infiltrant and has a hardness of about 60 $R_B$. Excess braze material is then cleaned away from the drill bit by turning the bit on a lathe.

EXAMPLE 1

A drill bit (58.9 mm. outer diameter and 42.1 mm. inner diameter) was constructed as shown in FIG. 2 using the procedure given above. The cutting elements were disc-shaped with a 8.4 mm. diameter. The thickness of the diamond and carbide layers were 0.5 mm. and 2.7 mm. The diamond layer was comprised of diamond particles between 80/100 and 120/140 U.S. std. mesh (50% by weight of each).

The drill was made initially with no cutter element protrusion. The elements were exposed by drilling for a short time to erode the drill crown matrix. The rake angle was −17 degrees.

This bit was tested in highway concrete to determine the life and the mode of failure of the drill. Test conditions were:

| Penetration rate: | 7.6 cm/min. |
|---|---|
| Drill speed: | 1000 rpm |
| Bit Weight: | approx. 80 lbs. |
| Stone: | highway concrete containing: Type 3A cement (one part by weight); Silica sand (1.9 parts by weight); Mountain stone aggregate (2.8 parts by weight); Compressive strength (28 day cure) - 6000 psi. |

Testing was carried out by making a succession of 15.2 cm. deep holes in an 20.3 cm. thick concrete block. The drill action was free, requiring 1.5–2.0 horsepower throughout the test. Cutting element wear was uniform and mainly on the face of the diamond layer. Overall wear on the outside diameter of the crown (across diametrically opposed cutters) was less than 0.127 mm. and less than 0.076 mm. on the inside diameter at a depth of 35.7 meters.

Drilling was terminated at 83 meters (540 holes of 15.2 cm each in a block) when the crown fractured and separated from the drill body. This test is considered successful because retnetion of the cutting elements in the crown was excellent and wear was uniform.

EXAMPLES 2 TO 4

Three drill bits were fabricated as shown in FIG. 3 using the procedure set forth above.

The cutting elements were arranged in an inner and in an outer tier of five (5) cutters on each tier. Each cutting element was comprised of a 8.4 mm. diameter compact disc with a 0.5 mm. and 2.7 mm. thickness diamond and carbide layers, respectively. The diamond layer was comprised of 50% by weight 80/100 and 120/140 diamond particles. The side rake angle (measured in a plane perpendicular to the axis of the bit) was −15° and top rake angle (measured in a plane parallel to the axis of the bit) was −17°. The inner and outer diameters were ground so that a flat was produced on the diamond layer of each element for improved gage wear. The inner diameter was ground to 49.20 mm. and the outer diameter to 75.31 mm. Each bit was hand-ground (with an aluminum oxide wheel) to expose the diamond edge. Each bit was then field tested in an active coal exploration site. The strata consisted mainly of sedimentary deposits in the clastic and organic classes. The operating bit speed was approximately 550 rpm.

A summary of their performance is given in TABLE 2 below:

TABLE 2

| Bit. No. | Strata | Bit. Wt. (lbs) | Total Penetration meters | Penetration Rate (meter/hr) | Reason Removed |
| --- | --- | --- | --- | --- | --- |
| 2 | medium shale | 3500 | 9 | 9 | Penetration slowed when harder strata encountered |
| 3 | hard conglomerate | 3500 | 1.5 | 5.5 slowed to 1.5 | Bit wore |
| 4 | mixed: broken coal shale, conglomerate sandstone | 700 | (total 13) 5 5 3 | 4.6– .9 | Penetration slowed when conglomerate was reached |

The following observations were made from the field test:

(1) Retention of the cutting elements in the crown was excellent.

(2) The bit operated very well in soft-medium strata.

(3) Wear on the inner row of cutters was greatest where the cutter forms a positive rake with the rock.

(4) In hard strata, considerably lower bit weights are required to prevent the cutters from breaking and the crown from wearing prematurely.

(5) Lower bit weights require that the cutters remain sharp to permit penetration into the rock. The unit stress at the cutting element/rock interface must be high enough to fracture the rock.

(6) The unit stress, while large enough at first, drops off as the diamond layer wears and the carbide substrate of the cutter is allowed to bear against the rock. This relatively large, dull wear resistant bearing surface prevents rock fracture especially in hard strata. This can be overcome by decreasing the cutter thickness by grinding off a portion of the carbide substrate.

EXAMPLES 5 AND 6

Two bits were fabricated essentially as shown in FIGS. 1A and 1B in accordance with the procedure described above. The bit No. 5 differed from the embodiment of FIGS. 1A and 1B in that only three cutting elements each were provided at the periphery and at the center of the bit crown. Bit No. 6 differed from the embodiment of FIGS. 1A and 1B in that six cutting elements each were provided at the periphery and at the center of the bit crown. The dimensions of the cutting elements are set forth in TABLE 3 below:

TABLE 3

| | Bit Nos. 5 & 6 | |
| --- | --- | --- |
| | Periphery | Center |
| Thickness-diamond layer: | 0.5 mm. | 5 mm. |
| Thickness carbide layer: | 8.4 mm. | 8.4 mm. |
| Shape: | 180° disc | rectangular parallelopiped |
| Diameter: | 8.4 mm. | — |
| Length: | — | 8 to 12 mm. |
| Width: | — | 1 to 2 mm. |

The bits were tested in limestone to determine the life and mode of failure. Test conditions were:

Penetration rate: 61 cm/min.
Drill speed: 2000 to 3000 rpm

The bit No. 5 penetrated approximately 9 meters of rock before one of the three peripheral cutters was broken in half. It is believed that the cutter broke due to a manufacturing defect, wherein poor support was provided for the cutter in the crown. Drilling was then continued and a penetration rate of approximately 63.5 cm/min. was obtained. While it showed a good penetration rate, vibration was found to be excessive and drilling was terminated.

In the test of the bit No. 6, bit No. 6 was not preground to expose the cutting elements and it was found to penetrate slowly initially. Drilling was stopped and the crown was ground away with an off-hand grinder fitted with an aluminum oxide wheel. Drilling was then restored and it was found to penetrate the limestone at approximately 89 cm/min. Drilling was continued until the penetration rate slowed to approximately 45.7 cm/min. At this point, the second bit had penetrated approximately 198 meters of limestone. This life is approximately 80% longer than that which was obtained at this location in a similar test site with a conventional non-coring drill bit with a drill crown surface set with natural diamond stones.

It will be appreciated by those skilled in the art that other embodiments of this invention are possible. For example, the cutting element rather than beng molded or "surface set" in the drill crown as described herein could be mounted by brazing in preformed recesses in the drill crown. Thus, while this invention has been described with respect to certain preferred embodiment thereof, other embodiments will be apparent to those skilled in the art. It is intended that all such embodiments be covered within the scope of the invention as set forth in the appended claims.

What I claim as new and desire to secure by Letters Patent of the United States is:

1. A method for making a diamond compact drill bit comprising the steps:

(a) mounting a plurality of cutting elements, each comprised of a diamond compact, in a mold;

(b) filling a drill crown portion of the mold surrounding said elements with a metal powder;

(c) inserting a drill shaft into said mold;

(d) filling said portion of said mold surrounding said elements with a molten solder having a flow point of less than 700° C.;

(e) allowing said solder to solidify; and (f) removing the drill bit so formed from the mold.

2. The method of claim 1 wherein said elements are located in said mold so as to dispose said elements at a rake angle between about −10° and −25° in the crown of the bit.

3. The method of claim 1 wherein said solder is a silver solder.

4. The method of claim 3 wherein said solder consists of about, by weight, 45% Ag, 15% Cu, 16% Zn, and 24% Cd.

5. A method of making a diamond compact drill bit comprising the steps of:

(a) mounting a plurality of diamond compact cutting elements in a mold;

(b) filling a drill crown portion of the mold surrounding said elements with a matrix metal powder;

(c) inserting a drill shaft into said mold;

(d) positioning low temperature alloy material around the drill body at the top of the mold, said alloy having a flow point below the thermal degradation point of said diamond compacts;

(e) heating the mold and its contents to a temperature below the thermal degradation point of said diamond compacts to cause said alloy material to melt and flow into the mold cavity;

(f) cooling the mold and its contents to solidify the molten alloy; and (g) removing the drill bit so formed from the mold.

6. The method of claim 5 wherein said low temperature alloy has a flow point of less than about 700° C.

* * * * *